United States Patent [19]

Kondo et al.

[11] Patent Number: 5,406,334
[45] Date of Patent: Apr. 11, 1995

[54] APPARATUS AND METHOD FOR PRODUCING A ZOOMED IMAGE SIGNAL

[75] Inventors: Tetsujiro Kondo; Takashi Horishi, both of Kanagawa, Japan

[73] Assignee: Sony Corporation, Tokyo, Japan

[21] Appl. No.: 296,407

[22] Filed: Aug. 26, 1994

[30] Foreign Application Priority Data

Aug. 30, 1993 [JP] Japan .................. 5-213961

[51] Int. Cl.$^6$ .......................................... H04N 5/262
[52] U.S. Cl. ................................. 348/581; 348/704; 348/240; 358/451
[58] Field of Search ............... 348/704, 240, 581; H04N 5/14, 3/223, 262; 395/102; 382/47; 358/451; 345/127, 130

[56] References Cited

U.S. PATENT DOCUMENTS

| | | | |
|---|---|---|---|
| 4,589,029 | 5/1986 | Torimani et al. | 348/704 |
| 4,951,125 | 8/1990 | Kojima et al. | 348/704 |
| 5,008,752 | 4/1991 | Van Nostrand | 348/451 |
| 5,107,254 | 4/1992 | Choi | 348/704 |
| 5,307,167 | 4/1994 | Park et al. | 348/704 |

Primary Examiner—James J. Groody
Assistant Examiner—Glenton B. Burgess
Attorney, Agent, or Firm—William S. Frommer; Alvin Sinderbrand

[57] ABSTRACT

Apparatus and methods are provided for producing a zoomed image signal from an input image signal. The input image signal is separated into a number of block signals each representing a subarea of the input image. Class codes are produced based on the block signals. Each class code identifies predetermined image data of a zoomed image portion which corresponds to the subarea represented by the block signal on which the class code is based. The predetermined image data is generated in response to each class code. Shifted display positions are assigned for image data of the selected block signals, and the zoomed image signal is synthesized from the image data having shifted display positions and the predetermined image data such that the predetermined image data are assigned display positions intermediate the shifted display positions of the other data.

12 Claims, 7 Drawing Sheets

APPARATUS AND METHOD FOR PRODUCING A ZOOMED IMAGE SIGNAL

BACKGROUND OF THE INVENTION

The present invention relates to methods and apparatus for producing a zoomed image signal from an input image signal, Conventional techniques for enlarging the image represented by an image signal by synthesizing a zoomed image signal employ a linear interpolating filter or the like in order to produce pixels to be included in the zoomed image signal by interpolation.

The use of a linear interpolating filter to produce a zoomed image signal results in a loss of picture resolution at edge and boundary positions of the zoomed picture, so that the zoomed picture becomes blurred, This effect becomes more pronounced with higher zoom ratios.

Since it is the intent in zooming the picture to enable details of an object to be viewed, the loss of image resolution as a result of zooming is particularly problematic.

OBJECTS AND SUMMARY OF THE INVENTION

It is an object of the present invention to provide methods and apparatus for producing a zoomed image signal from an input image signal which alleviate the foregoing problems of prior art techniques.

In accordance with an aspect of the present invention, an apparatus for producing a zoomed image signal from an input image signal representing an input image comprises: means for separating at least a portion of the input image signal into a plurality of block signals each including plural image data and representing a subarea of the input image represented by the input image signal; class code producing means for producing a class code for each of selected ones of the plurality of block signals, each class code identifying predetermined image data of a zoomed image portion corresponding to the subarea of the input image represented by the block signal for which the class code is produced; image data generating means for generating the predetermined image data in response to each class code produced by the class code producing means; display position shifting means for assigning shifted display positions for the plural image data of the selected ones of the plurality of block signals; and synthesizing means for synthesizing the zoomed image signal from the plural image data having shifted display positions and the predetermined image data such that the predetermined image data are assigned display positions intermediate the shifted display positions of the plural image data.

In accordance with another aspect of the present invention, a method for producing a zoomed image signal from an input image signal representing an input image, comprises the steps of: separating at least a portion of the input image signal into a plurality of block signals each including plural image data and representing a subarea of the input image represented by the input image signal; producing a class code for each of selected ones of the plurality of block signals, each class code identifying predetermined image data of a zoomed image portion corresponding to the subarea of the input image represented by the block signal for which the class code is produced; generating the predetermined image data in response to each class code produced by the class code producing means; assigning shifted display positions for the plural image data of the selected ones of the plurality of block signals; and synthesizing the zoomed image signal from the plural image data having shifted display positions and the predetermined image data such that the predetermined image data are assigned display positions intermediate the shifted display positions of the plural image data.

The above and other objects, features, and advantages of the present invention will become apparent from the following detailed description of illustrative embodiments thereof to be read in conjunction with the accompanying drawings, in which like reference numerals are used to identify the same or similar elements.

DETAILED DESCRIPTION OF CERTAIN ADVANTAGEOUS EMBODIMENTS

Figure 1:
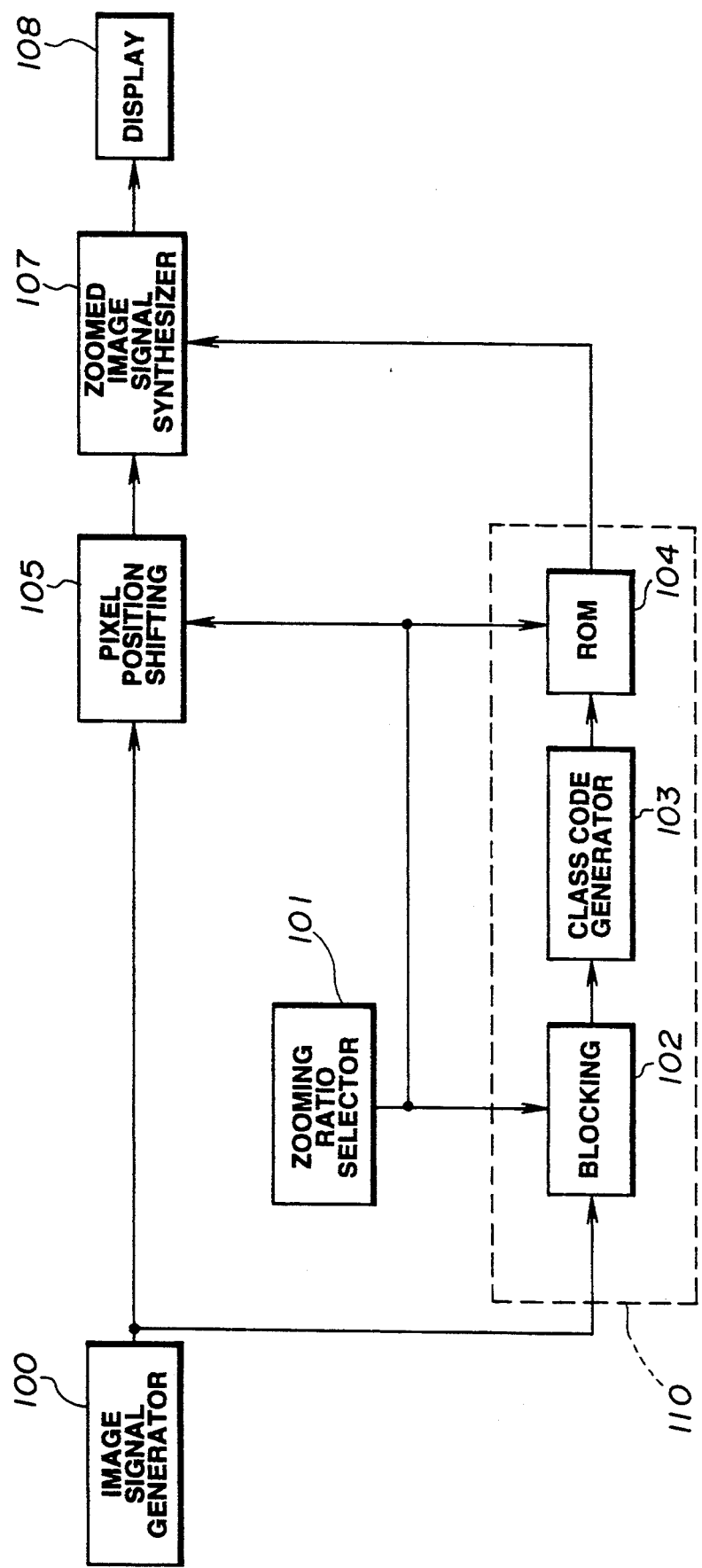
FIG. 1 is a block diagram of an apparatus for producing a zoomed image signal and displaying the same in accordance with an embodiment of the present invention.

With reference now to the drawings, and initially to FIG. 1 thereof, an apparatus for producing a zoomed image signal from an input image signal in accordance with an embodiment of the present invention is illustrated therein in block form. In the apparatus of FIG. 1, an image signal generator 100 serves to produce an input image signal from an optical image. Image signal generator 100 can be, for example, a video camera.

A zoom ratio selector 101 provides a user with the ability to select a zoom ratio for the zoomed image signal from a plurality of predetermined zoom ratios. In response to such a selection, the selector 101 outputs a zoom ratio signal to a blocking circuit 102 of an interpolated image data generator circuit 110.

The blocking circuit 102 separates at least a portion of the input image signal from the image signal generator 100 into a plurality of block signals, each including a number of pixels and representing a subarea of the input image represented by the input image signal. The blocking circuit 102 selects the portion of the input image signal corresponding with a zoomed image to be produced with the apparatus of FIG. 1, based on the zoom ratio signal. The circuit 102 in one embodiment divides the image data falling within the zoomed area into 8×8 pixel block signals each corresponding with a subarea of the input image. In other embodiments, block signals of different sizes and shapes are employed. Blocking may be carried out by circuit 102 in a number of ways, such as by simply extracting the pixels of the particular blocks or subareas of interest as the block signals. Advantageously, however, where the input image signal is provided in the form of pixel data, in blocking the pixel data are subjected to data compression such as adaptive dynamic range compression (ADRC), differential PCM (DPCM), vector quantization (VQ), discrete cosine transform (DCT) or other form of data compression.

In carrying out ADRC, the pixel data are separated into blocks as described above, a dynamic range is defined for each block based on a maximum pixel value and a minimum pixel value thereof and a number of quantizing bits for the block is selected based on the dynamic range for encoding each of the pixels thereof. The minimum pixel value is subtracted from each of the pixels of the block and the remainder is encoded using the selected number of quantizing bits. Accordingly, the encoded block includes the re-encoded pixel data, together with dynamic range data and data representing one of the maximum and minimum values. ADRC is useful to eliminate the effect of DC luminance while preserving the basic picture pattern. The number of bits used to encode the pixel data is selected to preserve the pattern information while minimizing the necessary number of bits.

The block signals produced by the blocking circuit 102 are supplied to a class code generator 103 which produces a class code based on each block signal. Each class code identifies predetermined image data of a zoomed image portion corresponding to the subarea of the input image represented by the block signal on which the class code is based. The class codes thus generated are supplied to a ROM 104.

The ROM 104 stores a plurality of the predetermined image data in association with respective class codes and the selected zoom ratio signal which is also supplied to the ROM 104 from the zoom ratio selector 101. The ROM 104 employs the class codes and selected zoom ratio signal either directly as read addresses, or else indirectly by producing read addresses therefrom, to read out selected ones of the plurality of predetermined image data to be used as interpolated image data by a zoomed image signal synthesizer 107 to synthesize a zoomed image signal, as described below.

Other types of memory devices may be used in place of the ROM 104. For example, a flash memory or other non-volatile memory device may be used. In the alternative, the image data produced in accordance with the above process may be read from a tape, disk or other storage device and stored in a RAM in place of the ROM 104.

Figure 2A:
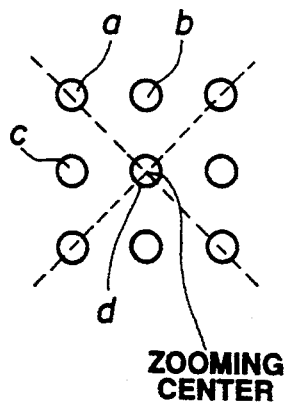
FIGS. 2(a) and 2(b) are schematic diagrams for illustrating pixel positions of a basic picture and of a corresponding zoomed picture enlarged from the basic picture by a factor of two.
Figure 2B:
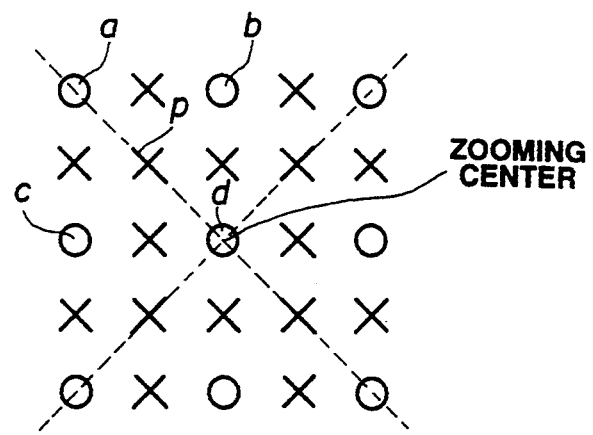

The input image signal from the image signal generator 100 is also supplied to a pixel position shifting circuit 105 which is also supplied with the zoom ratio signal from the selector 101. Based on the zoom ratio signal, the shifting circuit 105 modifies pixel positions of those pixels within the input image signal so that they occupy the correct positions within the zoomed image signal to produce the desired zoomed image. With reference also to FIG. 2(a), a 3×3 pixel block of the input image signal at the center of a portion of the signal which is to be zoomed (zooming center) is illustrated therein. FIG. 2(b) illustrates the relative positions of the same pixels (as circular symbols) after their positions have been shifted by the circuit 105 in response to a zoom ratio signal indicating a zoom ratio of 2. In FIG. 2(b), positions to be filled with pixels of interpolation image data are indicated by X's. The zoom ratio generation method as disclosed in JP Patent Kokai Publication No. 4-318766 is useful in this regard.

After position shifting by the circuit 105, the pixels of the input image signal are supplied to the zoomed image signal synthesizer 107. With reference again to FIG. 2(b) the zoomed image signal synthesizer inserts the interpolated pixels output by the ROM 104 at picture positions X between the positions of the pixels as supplied by the shifting circuit 105, thus to produce a synthesized zoomed image signal. After synthesizing the zoomed image signal, the synthesizer 107 outputs the zoomed image signal on a line-by-line basis to a display 108 for producing a display of the zoomed image.

In order to produce the interpolation image data to be stored in the ROM 104, a learning procedure is carried out as follows: The image data of a basic picture is obtained, for example, from a video camera, and zoomed data representing the same image is also obtained by optically zooming the video camera in accordance with a selected zoom ratio. With reference again to FIG. 2(a) it is now assumed that the pixel data illustrated therein constitute a 3×3 pixel block centered at the zooming center of the basic image data, and with reference to FIG. 2(b), it is assumed that the pixel data illustrated therein represent the data of the zoomed image signal produced by optically zoom the video camera at a zoom ratio of two.

The image data representing the basic picture and the image data representing the zoomed picture are separated into block signals, in this example, selected as 3×3 pixel blocks. Subsequently, a class code is produced for each block signal of the basic picture. Then the blocks of the zoomed image data are grouped according to class codes of the corresponding blocks of the basic image data. Training is then carried out for each class code to produce optimal image data to be stored in the ROM 104 which is obtained from the corresponding blocks of the zoomed image data. For example, the block signals of the zoomed image data having the same class code can be averaged to produce such optimal data, the optimal values may be selected from such block signals, or else the optimal values may be produced using fewer than all of the block signals. This process is carried out for all of the block signals of the basic image data and zoomed image data to assemble a table of values which is then stored in the ROM 104.

There are a number of techniques which may be employed to produce the class codes. One technique is simply to concatenate the pixel data of each block signal in a predetermined order. However, if the data are uncompressed this can produce an impracticably large class code which would require the use of a ROM having an extremely large capacity. By carrying out adaptive dynamic range coding (ADRC), however, the class code for each block signal may then be generated by concatenating the requantized pixel data which is encoded with fewer bits thus to advantageously reduce the number of classes. The class code CC of each block produced in this manner may be defined by the following relationship:

$$CC = \sum_{i=1}^{3} q_i (2^P)^{i-1} \quad (1)$$

wherein $q_i$ represents the ADRC code of a respective pixel i (in the present example i=1 to 3) and p represents the number of bits used to encode each pixel by ADRC. Other techniques for forming class codes will be apparent from the foregoing description, as the class codes need only identify the picture patterns inherent in the various block signals.

Figure 3:
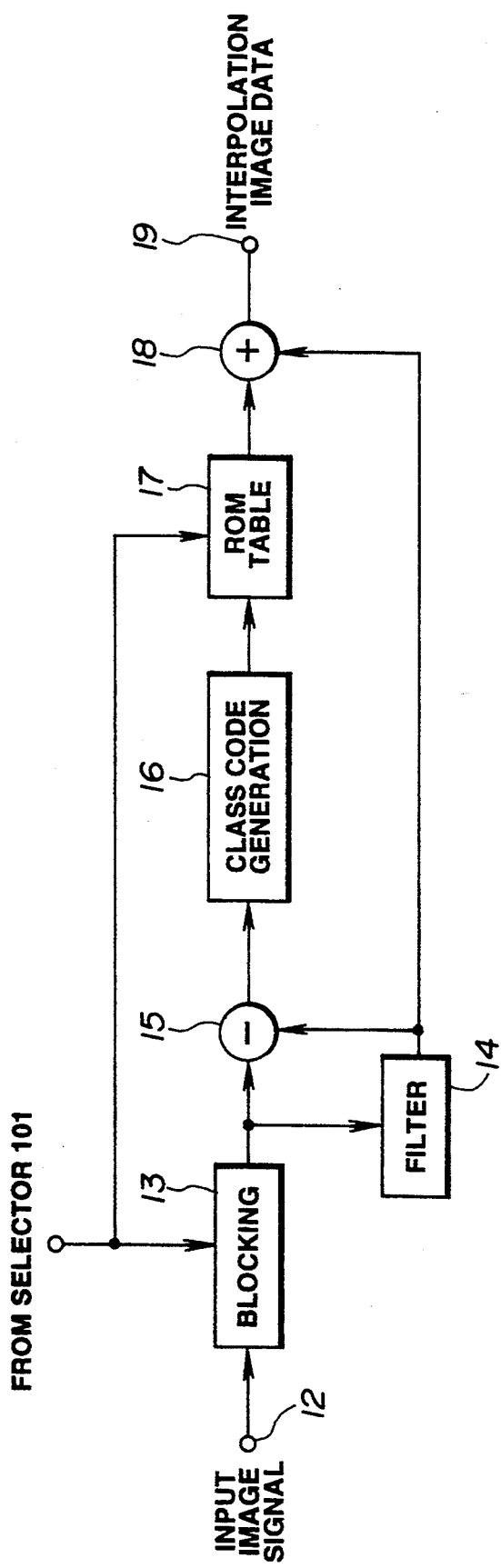
FIG. 3 is a block diagram of an alternative embodiment of an interpolation image data generator circuit which may be used in the apparatus of FIG. 1.

Another embodiment of an interpolation image data generator circuit is illustrated in block form in FIG. 3. In the apparatus of FIG. 3, the input image signal is received at an input terminal 12 and supplied to a blocking circuit 13 which divides the input image signal into a plurality of block signals which it then supplies both to a filter 14 and to an input of a subtracting circuit 15. The filter 14 is a conventional noise reducing filter suitable for reducing noise in an image signal. One exemplary noise reducing filter which may be employed as the filter 14 is a median-value filter. The filter 14 supplies a filtered image signal at an output therewith coupled with a further input of the subtracting circuit 15. The subtracting circuit 15 produces a difference image signal representing differences between each filtered block signal from the filter 14 and each block output by the blocking circuit 13, and supplies each difference block signal to a class code generation circuit 16.

The class code generation circuit 16 responds to each difference block signal by supplying a class code therefor which it supplies to a ROM 17 (or other suitable memory) which uses the class code together with the zoom ratio signal from selector 101 (either as an address or to produce an address) to read out corresponding interpolation difference image data. The interpolation difference image data represents differences between the filtered block signal output by the filter 14 and predetermined interpolation image data to be supplied by the apparatus of FIG. 3. The ROM 17 supplies the interpolation difference image data to a first input of an adding circuit 18 which receives the corresponding filtered block signal from the filter 14 at a second input, and combines the two input signals to produce the interpolation image data which it supplies at an output 19 to the zoomed image signal synthesizer 107 of FIG. 1.

A procedure for training the apparatus of FIG. 3 is similar to that of the apparatus of FIG. 1, except that the corresponding blocks of the basic image data and zoomed image data are first subjected to filtering by a filter having the same characteristics as the filter 14 to produce filtered data which is then subtracted from the original blocks to produce difference image data. Training is then conducted using the difference image data to produce class codes and the interpolation image data to be stored in the ROM 17 in the same manner in which the apparatus 110 of FIG. 1 is trained.

Figure 4:
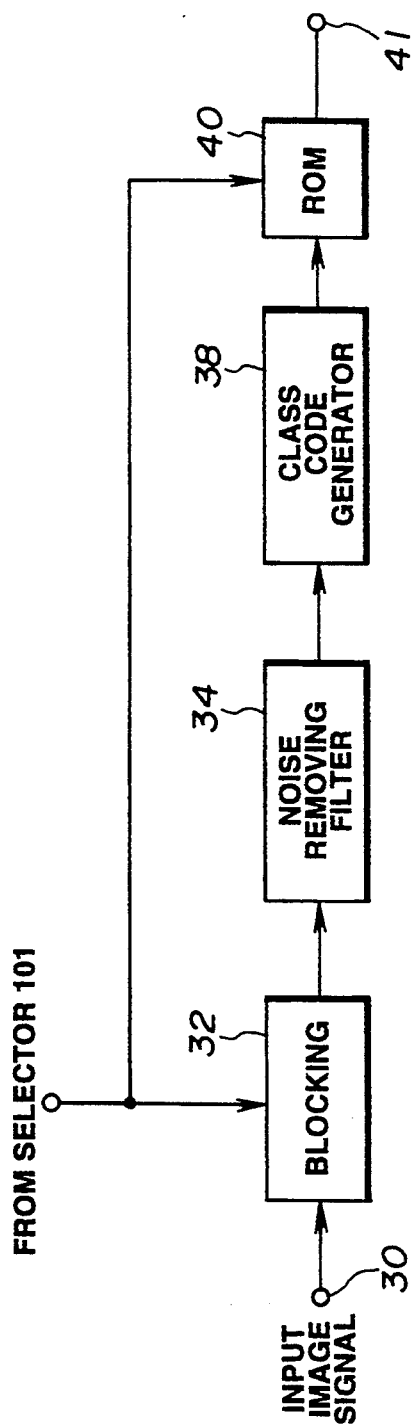
FIG. 4 is a block diagram of a further embodiment of an interpolation image data generator circuit which may be used in the apparatus of FIG. 1.

FIG. 4 illustrates a further embodiment of an interpolation image data generating circuit in block diagram form. In the apparatus of FIG. 4, the input image signal is received at an input terminal 30 and supplied therefrom to a blocking circuit 32. The blocking circuit 32 also receives the zoom ratio signal from selector 101 and produces a plurality of block signals from the input image signal for at least the portion thereof corresponding to the zoomed image and supplies the block signals to a noise removing filter 34 of a type suitable for removing noise from an image signal. The noise removing filter 34 produces a filtered block signal from each block signal supplied thereto by the blocking circuit 32 and supplies the filtered block signal to a class code generator 38 which produces a class code therefrom for identifying corresponding interpolation image data stored in a ROM 40. The ROM 40 receives each class code from the generator 38 together with the zoom ratio signal from the selector 101 and employs these signals either as a read address, or to produce a suitable read address, to read corresponding interpolation image data to an output terminal 41 from which the interpolation image data is supplied to the synthesizer 107 to produce a zoomed image signal.

Training of the circuit of FIG. 4 is carried out in a manner similar to that of the interpolation image data generator 110 of FIG. 1, except that each block of the basic signal and of the zoomed image signal is subjected to filtering by a filter having the same characteristics as the noise removing filter 34 prior to class code generation and training.

Figure 5:
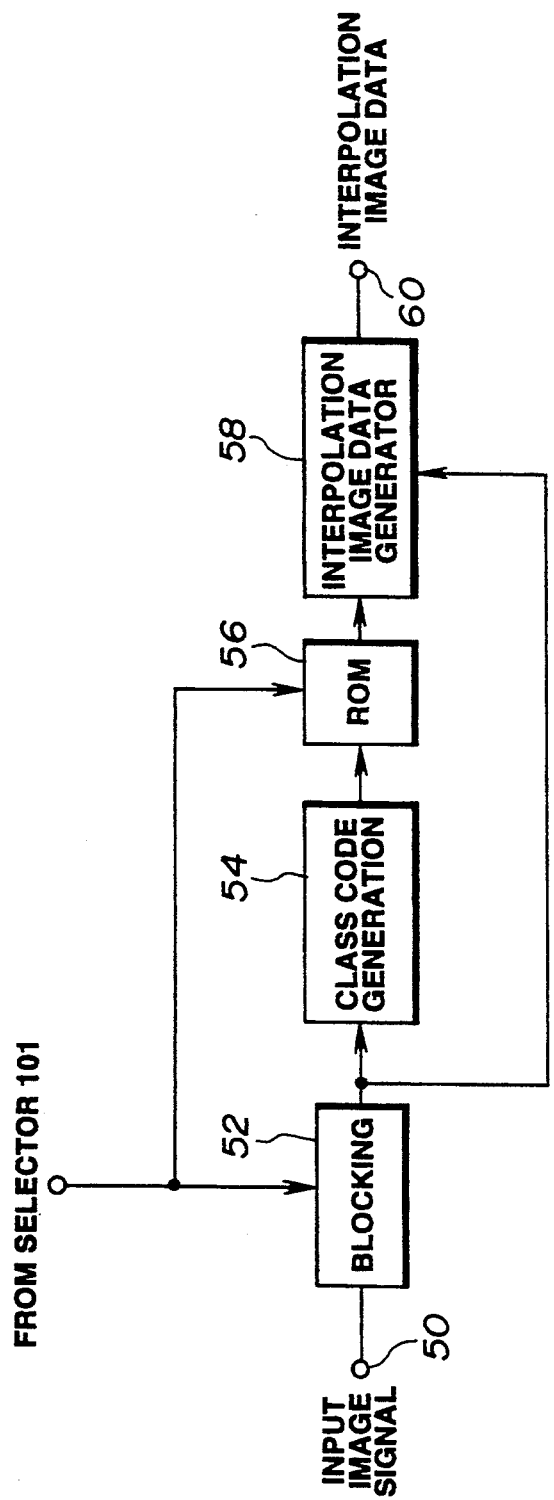
FIG. 5 is a block diagram of still another embodiment of an interpolation image data generator circuit which may be used in the embodiment of FIG. 1.

Referring now to FIG. 5, a further embodiment of an interpolation image data generation circuit is illustrated in block form therein. In the apparatus of FIG. 5, the input image signal is received at an input terminal 50 from which it is supplied to a blocking circuit 52. The blocking circuit 52 also receives the zoom ratio signal from selector 101 and serves to divide the input image signal into a plurality of block signals corresponding to the zoomed image which it supplies to a class code generation circuit 54. In response to each block signal, the class code generation circuit 54 produces a corresponding class code which it supplies to a ROM 56 and which identifies interpolation image data in the form of coefficient data sets for various zoom ratios corresponding to the block signal from which the class code was produced. ROM 56 stores a plurality of coefficient data sets each at a respective address associated with the corresponding class code and zoom ratio signal, and the ROM 56 employs each class code and zoom ratio signal (or an address derived therefrom) as a read address for reading out a corresponding coefficient data set.

Each coefficient data set includes a plurality of factors each of which is used by an interpolation image data generator 58 together with the corresponding block signal to produce the interpolation image data which it supplies at an output terminal 60 to the zoomed image signal synthesizer 107 for producing the zoomed image signal.

Training of the apparatus of FIG. 5 is carried out in substantially the same manner as the interpolation image data generator 110 of FIG. 1, except that in the training step, the coefficient data sets are produced instead of the interpolation image data.

A technique for training the apparatus of FIG. 5 is now explained. It is assumed that each pixel of the zoomed image data block to be produced by the generator 58 will have a value $Y_{os}$ which will be produced by a combination of factors $w_{1s}$ through $w_{ns}$ with pixel values $x_{IN1}$ through $x_{INn}$ of a block signal produced by the blocking circuit 52, according to the following relationship:

$$y_{os} = w_{1s}x_{IN1} + w_{2s}x_{IN2} + \ldots + w_{ns}x_{INn} \qquad (2)$$

where s represents an index for identifying the respective pixel $Y_{os}$ of the interpolation image data block to be output by the generator 58. Training is carried out by clustering the blocks of the input image signal having a respective class code with the corresponding blocks of the zoomed image signal representing the same image. Then each corresponding pixel of the zoomed image data block corresponding to the same class code is used along with all the pixel values of the corresponding block signals of the input image signal to produce each of the coefficient data to be stored in the ROM 56.

The method for obtaining the coefficient data is derived in the following manner. Each of the corresponding pixels of the zoomed image data block is assumed to have a value equal to a value represented by a polynomial obtained by multiplying respective coefficient data values $w_1$ through $w_n$ (where n is the number of pixels in each block signal of the input image signal) by corresponding pixel values of a block signal of the input image signal, as expressed by the following relationship:

$$y_k = w_1 x_{k1} + w_2 x_{k2} + \ldots + w_n x_{kn} \qquad (3)$$

wherein $y_k$ represents the corresponding pixel value of a respective block signal k of the zoomed image data, $x_{k1}$ through $x_{kn}$ represent the values of the various pixel data of the corresponding block signal of the input image signal and $w_1$ through $w_n$ represent the coefficient data values which are to be obtained.

If the number of block signals which yield the same respective class code is equal to m, it will be appreciated that if $m > n$, the values of $w_1$ through $w_n$ will not be fixed unequivocally. Optimal values for the coefficient data $w_1$ through $w_n$ are, therefore, sought and for this purpose, the elements $e_k$ of an error vector e are obtained according to the following relationship:

$$e_k = y_k - (w_1 x_{k1} + w_2 x_{k2} + \ldots + w_n x_{kn}) \qquad (4)$$

The values of the coefficients $w_1$ through $w_n$ are assumed to be those values which will minimize the error vector e, so that these coefficient values are determined according to the least squares method, expressed by the following relationship:

$$e^2 = \sum_{k=1}^{m} \{e_k\}^2 \qquad (5)$$

Then the partial derivatives of both sides of relationship (5) above are obtained as follows:

$$\frac{\partial e^2}{\partial w_i} = \sum_{k=1}^{m} 2\left(\frac{\partial e_k}{\partial w_i}\right) e_k = \sum_{k=1}^{m} 2(x_{ki}) e_k \qquad (6)$$

Since the minimum error occurs where all of the partial derivatives of relationship (6) above equal zero, the substitutions of relationships (7) and (8) below are made to yield the simultaneous linear equations represented by the matrix equation (9) below:

$$X_{ij} = \sum_{k=1}^{m} x_{ki} \cdot x_{kj} \qquad (7)$$

$$Y_i = \sum_{k=1}^{m} x_{ki} \cdot y_k \qquad (8)$$

$$\begin{bmatrix} X_{11} & X_{12} & \ldots & X_{1n} \\ X_{21} & X_{22} & \ldots & X_{2n} \\ \ldots & \ldots & \ldots & \ldots \\ X_{n1} & X_{n2} & \ldots & X_{nn} \end{bmatrix} \begin{bmatrix} (w_1) \\ (w_2) \\ (w_3) \\ (w_4) \end{bmatrix} = \begin{bmatrix} (Y_1) \\ (Y_2) \\ (Y_3) \\ (Y_4) \end{bmatrix} \qquad (9)$$

The matrix equation (9) is then solved, for example, by means of a sweep-out method, to find the optimal values of the various factors $w_1$ through $w_n$ and these values are stored in the ROM 56. Corresponding coefficient data sets are obtained for each respective pixel position of the corresponding zoomed image data blocks and all are stored according to the respective class code in the ROM 56.

Figure 6:
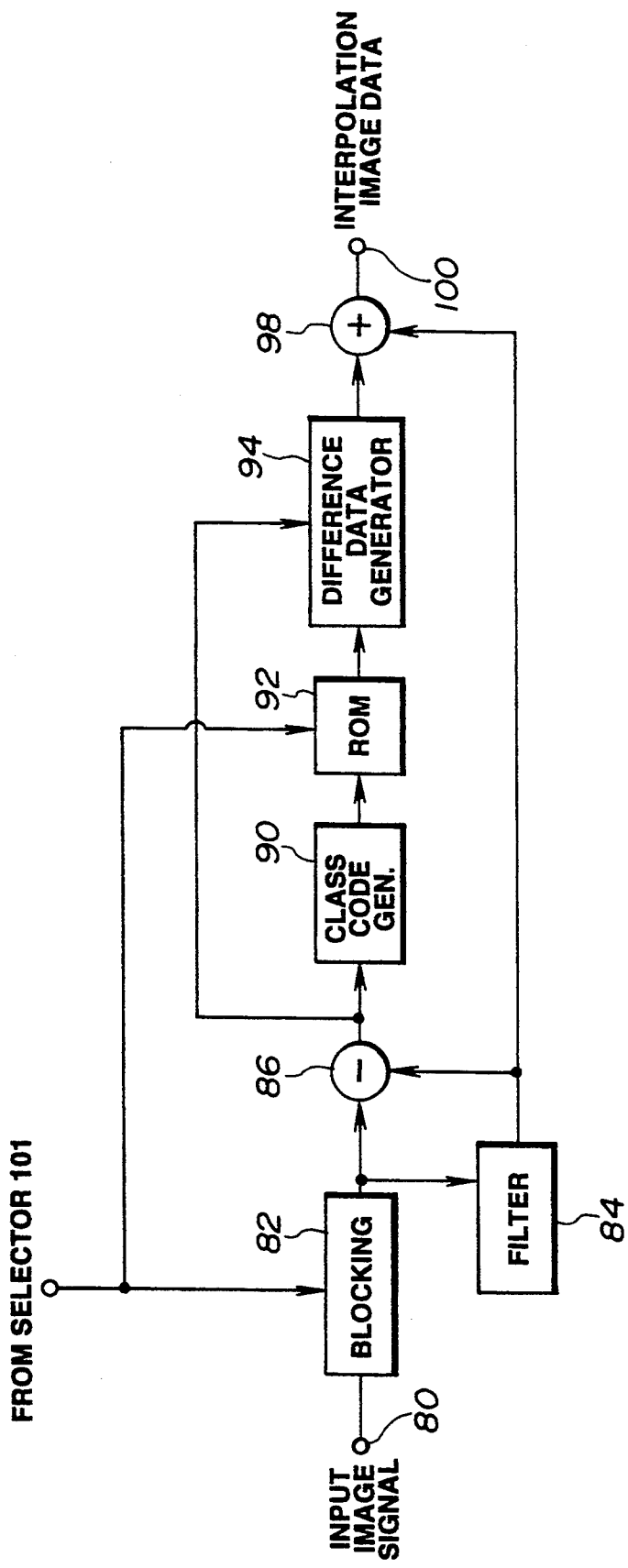
FIG. 6 is a block diagram of a still further embodiment of an interpolation image data generator circuit usable in the embodiment of FIG. 1.

Referring now to FIG. 6, a further embodiment of an interpolation image data generator circuit is illustrated therein in block format. In the apparatus of FIG. 6, the input image signal is received at an input terminal 80 and supplied therefrom to a blocking circuit 82. Blocking circuit 82 selects a portion of the input image signal corresponding to a zoomed image, as determined in accordance with the zoom ratio signal received from the selector 101, and separates the selected data into a plurality of block signals which it supplies both to an input of a filter 84 and a subtracting circuit 86. The filter 84, which is suitable for filtering image signals to remove noise, produces filtered block signals from the received block signals and supplies these to a further input of the subtracting circuit 86. The subtracting circuit 86 produces difference block signals from each of the block signals output by the blocking circuit 82 and its corresponding filtered block signal.

Each difference block signal is supplied by the subtracting circuit 86 to a class code generator 90 which produces a class code for each difference block signal. Each class code identifies interpolation difference image data representing differences between a filtered block signal supplied from the filter 84 and a block of the interpolation image data to be produced by the apparatus of FIG. 6. A ROM 92 (or other suitable storage device) stores a plurality of coefficient data sets each at a respective address associated with the corresponding class code and zoom ratio signal supplied from a selector 101. Each coefficient data set includes a number of factors for each multiplying a corresponding value included in the difference block signal on which the code is based, in order to yield the value of a corresponding interpolation difference image data block. The ROM 92 reads out a coefficient data set in response to each class code and zoom ratio signal to a difference data generator 94 which is also provided with the difference block signal produced by the subtracting circuit 86. The difference data generator 94 produces a block of the interpolation difference image data based on a difference block signal and its corresponding coefficient data set by multiplying each factor of the coefficient data set by a corresponding value of the difference block signal and summing the products. The interpolation difference image data produced by the generator 94 is supplied thereby to an input of an adding circuit 98 which receives the filtered block signal at a second input and sums the two signals to produce a block of the interpolation image data. The adding circuit 98 supplies each block of the interpolation image data at an output terminal 100 from which the blocks are supplied to the zoomed image signal synthesizer 107 for producing the zoomed image signal.

Training of the apparatus of FIG. 6 is carried out in a manner similar to that of the FIG. 3 apparatus, except that the training step is performed to produce coefficient data using the data from difference block signals.

Figure 7:
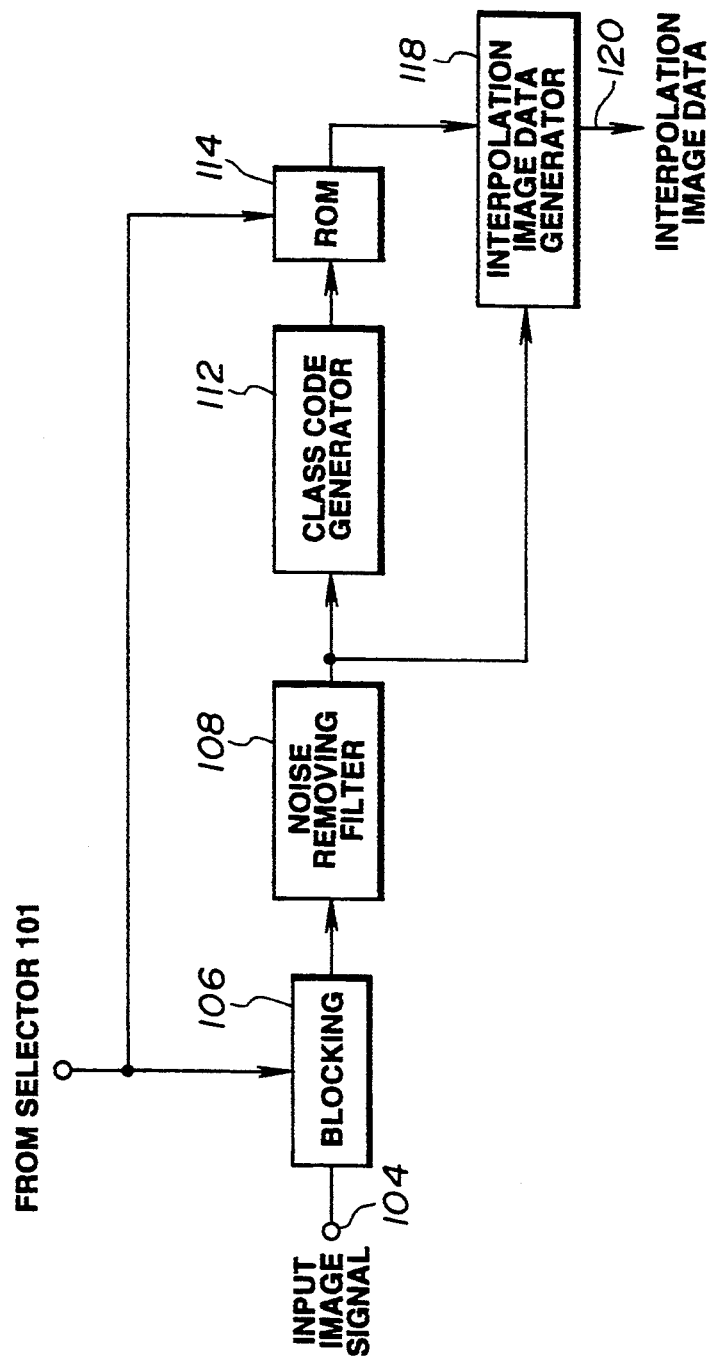
FIG. 7 is a block diagram of another embodiment of an interpolation image data generator circuit which may be used in the apparatus of FIG. 1.

A further embodiment of an interpolation image data generator circuit is illustrated in block form in FIG. 7. In the apparatus of FIG. 7, the input image signal is received at an input terminal 104 and supplied therefrom to a blocking circuit 106 which is also supplied with the zoom ratio signal from the selector 101. The blocking circuit 106 responds to the zoom ratio signal to select a portion of the input image signal corresponding to the desired zoomed image and divides this portion into a plurality of block signals. The blocking circuit 106 then provides the block signals to a noise removing filter 108 suitable for reducing noise in image signals. The filter 108 produces a filtered block signal from each block signal supplied thereto and applies each filtered block signal to a class code generator 112.

The class code generator 112 produces a class code for each corresponding filtered block signal. Each class code identifies a block of the interpolation image data corresponding to the block signal for which the code was produced. The class code generator 112 supplies each code to a ROM 114 (or other suitable storage device) which stores a plurality of coefficient data sets each at a respective address associated with a corresponding class code and zoom ratio signal from the selector 101. In response to each class code and zoom ratio signal, the ROM 114 reads out a coefficient data set to an interpolation image data generator 118 which is also supplied with the filtered block signal on which the corresponding class code is based. The interpolation image data generator 118 produces a block of the interpolation image data by multiplying each factor of the coefficient data set by a corresponding value of the filtered block signal and summing the various products to produce each of the pixels of the interpolation image data block. The generator 118 supplies each block of the interpolation image data at an output terminal 120 from which the blocks are supplied to the zoomed image signal synthesizer 107 to produce the zoomed image signal.

It will be appreciated that the various embodiments disclosed above may be implemented by hard wired circuits (such as ASIC's and the like), programmable devices (such as microprocessors, microcomputers, digital signal processors and the like) or a combination of hard wired circuits and programmable devices.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for producing a zoomed image signal from an input image signal representing an input image, comprising:

means for separating at least a portion of the input image signal into a plurality of block signals each including plural image data and representing a subarea of the input image represented by the input image signal;

class code producing means for producing a class code for each of selected ones of the plurality of block signals, each class code identifying predetermined image data of a zoomed image portion corresponding to the subarea of the input image represented by the block signal for which the class code is produced;

image data generating means for generating the predetermined image data in response to each class code produced by the class code producing means;

display position shifting means for assigning shifted display positions for the plural image data of the selected ones of the plurality of block signals; and synthesizing means for synthesizing the zoomed image signal from the plural image data having shifted display positions and the predetermined image data such that the predetermined image data are assigned display positions intermediate the shifted display positions of the plural image data.

2. The apparatus of claim 1, wherein the image data generating means comprises a memory storing a plurality of the predetermined image data in association with respective class codes, the memory being operative to read out selected ones of the plurality of predetermined image data in response to class codes produced by the class code producing means as the predetermined image data.

3. The apparatus of claim 1, wherein the image data generating means comprises a memory storing a plurality of coefficient data sets each at a respective address associated with a corresponding class code thereof, each coefficient data set including a plurality of factors, the memory being operative to read out selected ones of the plurality of coefficient data sets in response to class codes produced by the class code producing means; and means for producing the predetermined image data based on the selected ones of the plurality of coefficient data sets and the block signals for which the corresponding class codes are produced.

4. The apparatus of claim 3, wherein each of the plurality of coefficient data sets is based on first image data representing at least one image and second image data representing a zoomed version of said at least one image.

5. The apparatus of claim 1, further comprising zoom ratio selecting means for selecting a zoom ratio for the zoomed image signal from a plurality of predetermined zoom ratios; and wherein the image data generating means is operative to generate the predetermined image data based on the selected zoom ratio, and the display position shifting means is operative to assign the shifted display positions based on the selected zoom ratio.

6. The apparatus of claim 1, in combination with imaging means for producing the input image signal from an optical image and display means for producing a display of a zoomed image based on the zoomed image signal.

7. A method for producing a zoomed image signal from an input image signal representing an input image, comprising the steps of:

separating at least a portion of the input image signal into a plurality of block signals each including plural image data and representing a subarea of the input image represented by the input image signal;

producing a class code for each of selected ones of the plurality of block signals, each class code identifying predetermined image data of a zoomed image portion corresponding to the subarea of the input image represented by the block signal for which the class code is produced;

generating the predetermined image data in response to each class code produced by the class code producing means;

assigning shifted display positions for the plural image data of the selected ones of the plurality of block signals; and synthesizing the zoomed image signal from the plural image data having shifted display positions and the predetermined image data such that the predetermined image data are assigned display positions intermediate the shifted display positions of the plural image data.

8. The method of claim 7, wherein the step of generating the predetermined image data comprises: reading out selected ones of a plurality of predetermined image data from a memory in response to class codes produced by the class code producing means as the predetermined image data.

9. The method of claim 7, wherein the step of generating the predetermined image data comprises reading out a selected one of a plurality of coefficient data sets stored in a memory in response to each class code, and producing the predetermined image data based on the selected ones of the plurality of coefficient data sets and the block signals for which the corresponding class codes are produced.

10. The method of claim 9, wherein each of the plurality of coefficient data sets is based on first image data representing at least one image and second image data representing a zoomed version of said at least one image.

11. The method of claim 7, further comprising the step of selecting a zoom ratio for the zoomed image signal from a plurality of predetermined zoom ratios; and wherein the step of generating the predetermined image data comprises generating the predetermined image data based on the selected zoom ratio, and the step of assigning shifted display positions comprises assigning the shifted display positions based on the selected zoom ratio.

12. The method of claim 7, further comprising the steps of producing the input image signal from an optical image and displaying a zoomed image based on the zoomed image signal.

* * * * *